No. 837,780. PATENTED DEC. 4, 1906.
M. A. BLACK & F. F. SANFORD.
CHEESE BOX AND CUTTER.
APPLICATION FILED JUNE 3, 1905.

2 SHEETS—SHEET 1.

Witnesses
Geo. Ackman Jr.
D. W. Gould

Inventors
M. A. Black
F. F. Sanford,
By Victor J. Evans
Attorney

No. 837,780. PATENTED DEC. 4, 1906.
M. A. BLACK & F. F. SANFORD.
CHEESE BOX AND CUTTER.
APPLICATION FILED JUNE 3, 1905.
2 SHEETS—SHEET 2.
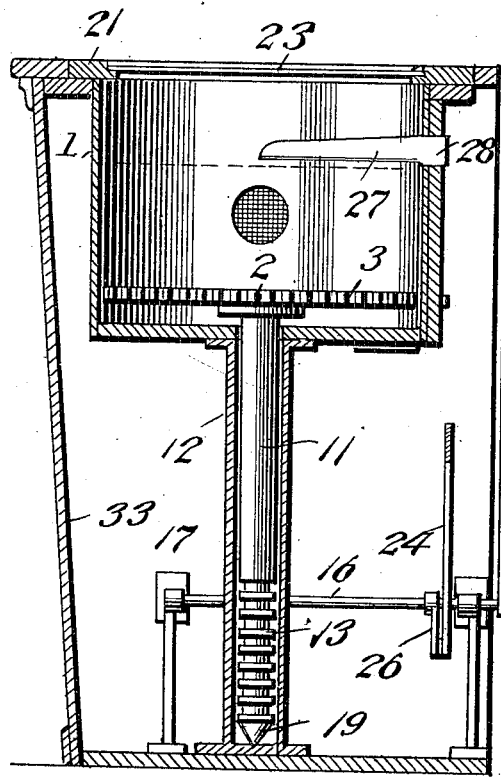
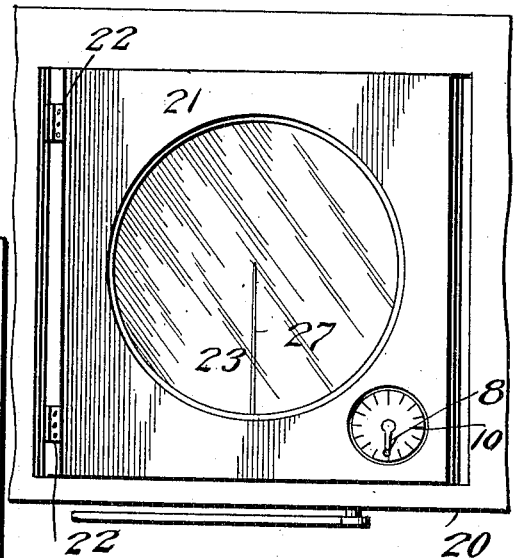
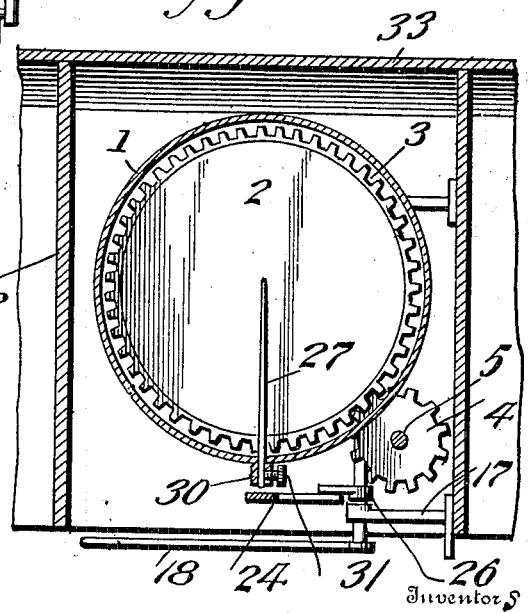
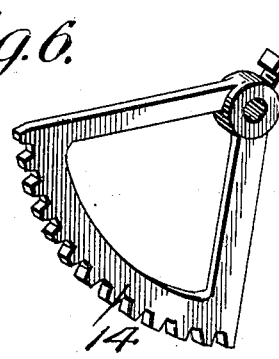
Witnesses
Geo. Ackman Jr.
D. W. Gould
Inventors
M. A. Black
F. F. Sanford,
By Victor J. Evans
Attorney

UNITED STATES PATENT OFFICE.

MATTHEW A. BLACK AND FRANK F. SANFORD, OF CALEDONIA, PENNSYLVANIA.

CHEESE BOX AND CUTTER.

No. 837,780.　　　Specification of Letters Patent.　　　Patented Dec. 4, 1906.

Application filed June 3, 1905. Serial No. 263,623.

*To all whom it may concern:*

Be it known that we, MATTHEW A. BLACK and FRANK F. SANFORD, citizens of the United States, residing at Caledonia, in the county of Elk and State of Pennsylvania, have invented new and useful Improvements in Cheese Boxes and Cutters, of which the following is a specification.

This invention relates to cheese boxes and cutters, the primary object of the invention being to provide a novel and handy form of combined cheese box and cutter especially designed with reference to the needs of dealers, the construction of the device embodying this invention being such that a cheese may be simultaneously uncovered, elevated to a point of access, and the predetermined amount (in weight) of cheese severed from the main body or mass of cheese ready for wrapping up and delivery to the customer.

The cheese box and cutter hereinafter described are particularly adapted to be combined with and located under an ordinary store-counter, while the lid of the box is adapted to constitute a portion of the counter-top, the device as a whole being in this way located in an out-of-the-way place, while at the same time convenient to the dealer, and by means of an operating-lever may perform the several operations above referred to with ease and expedition.

With the above and other objects in view, the nature of which will more fully appear as the description proceeds, the invention consists in the novel construction, combination, and arrangement of parts, as hereinafter fully described, illustrated, and claimed.

Figure 1:
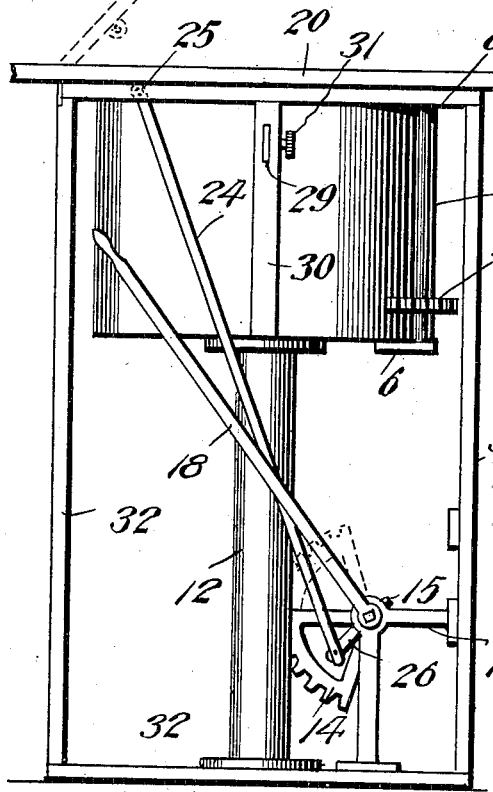
Figure 2:
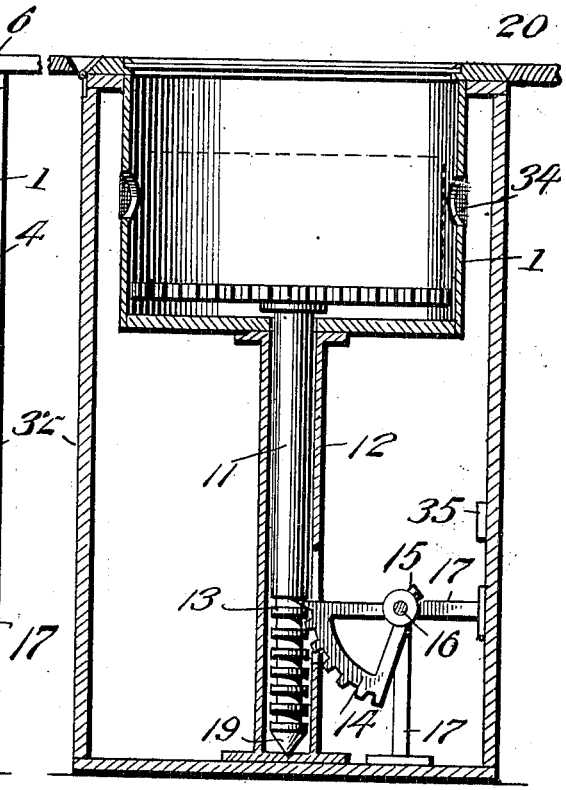
Figure 7:
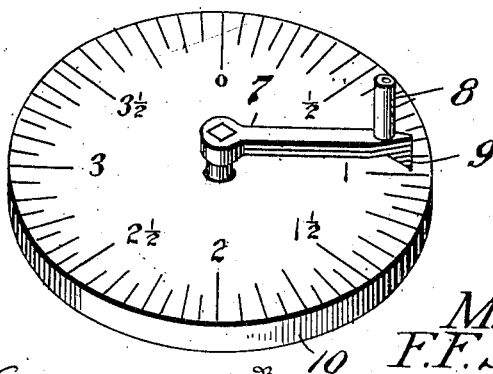

In the accompanying drawings, Figure 1 is a view in side elevation of the combined cheese box and cutter, showing also a frame in which the same is mounted and the operating devices. Fig. 2 is a vertical sectional view of the same. Fig. 3 is also a vertical sectional view taken at right angles to Fig. 2 and showing the device applied beneath an ordinary counter. Fig. 4 is a top plan view of the construction shown in Fig. 3. Fig. 5 is a horizontal section through the cheese-box, showing the turn-table, the operating-pinion therefor, the cutter, &c. Fig. 6 is a detail perspective view of the toothed segment for elevating the turn-table, and Fig. 7 is a perspective view of the dial for setting the turn-table.

Like reference-numerals designate corresponding parts in all figures of the drawings.

Referring to the drawings, 1 designates a box or receptacle, preferably of metal, galvanized or otherwise protected and made cylindrical in form and of a size adapted to contain an ordinary cheese. In the bottom portion of the box 1 is arranged a turn-table 2, the edge of which is toothed, as shown at 3, adapting it to be engaged and turned by means of a pinion 4, mounted upon an upright pinion-shaft 5, which is mounted in suitable bearings 6 and extends upward to a point above the top of the box, where it is provided with a combined indicator and operating-crank 7, having a suitable handle 8 and pointer 9, which operates over a dial 10, graduated according to any suitable system of weights, such as pounds and the fractions of pounds, the idea being to enable the dealer to turn the crank 7 and bring the pointer 9 to any desired graduation, at the same time turning the table 2 containing the cheese preparatory to severing a portion of the cheese, which severed portion will agree in weight to the particular graduation indicated by the pointer 9 of the dial 10.

Extending downward from the turn-table 2 is a standard 11, which is contained within a tubular step or casing 12, which extends downward from the bottom of the box and forms a support therefor. The standard 11 is provided with circular or annular teeth 13, which are engaged by a toothed segment 14, fastened by means of a set-screw 15 on a rock-shaft 16, mounted to turn in suitable bearings in one or more brackets 17 and operated by means of a hand-lever 18. By moving the lever 18 the toothed segment 14 is rocked and caused to raise and lower the standard 11 and the turn-table carried thereby, the circular teeth 13 maintaining a perfect engagement with the teeth of the segment 14 no matter to what point the turn-table may be revolved. The lower extremity of the standard 11 is preferably pointed, as shown at 19, to enable the turn-table to revolve easily when actuated by the pinion 4.

The cheese-box 1 may be located directly beneath a counter-top, (shown at 20,) and a section 21 of said top may be hinged, as shown at 22, so as to swing upward, and by preference said hinged section of the counter-top is provided with a glass panel 23, so that the cheese may be inspected and the movement thereof observed without lifting said counter-top section, which thus also constitutes a cover or lid for the box. In order to simultaneously lift the lid 20 and elevate the turn-table, a pitman 24 is pivotally connected at one end to the lid, as shown at 25, and at its opposite end to a crank-arm 26 on the rock-shaft 16, so that as said shaft is turned to elevate the turn-table the pitman 24 simultaneously raises the lid or counter-top section 20, thus uncovering the cheese as it is elevated to a point about four inches below the plane of the counter-top.

During the upward movement of the turn-table and the cheese carried thereby the cheese is subjected to the action of a radially-disposed cutter or knife 27, which serves to cut out a segment of the cheese in accordance with the amount desired by the customer and in accordance with the extent to which the turn-table and cheese have been previously turned by means of the operating-crank 7. The tang or shank 28 of the blade 27 is detachably fitted in a socket or opening 29 in a knife-supporting bar 30, located at one side of the box, and, if desired, made integral therewith, and the knife is held in place by means of a set-screw 31, inserted in the bar 30, as shown in Fig. 1.

The combined cheese box and cutter is preferably inclosed within a suitable frame, (indicated at 32.) Said frame may be complete in itself or the counter-front 33 may form a portion of said frame, as shown in Fig. 3. The cheese-box is also by preference provided at one or more points with screen-covered ventilation-ports 34. 35 designates a stop for limiting the outward movement of the lever 18 and bringing the turn-table to a stop in its upward movement as it comes in contact with the cutting edge of the knife 27, thus preventing injury to the knife by reason of the turn-table moving upward too far.

By means of the construction above described cheese may be kept beneath a counter out of the way and any desired amount of cheese can be cut by a single operation of the lever, which simultaneously raises the lid or cover of the box, makes the cut at the proper point, and moves the cheese and the cut portion to a convenient point of access about four inches below the plane of the counter-top. By reversing the movement of the lever the remainder of the cheese is again lowered into the box and the lid closed over the box and its contents. If desired, the cutter or knife may be omitted, as the cheese-box, with its turn-table and swinging lid or cover, will be found of great convenience even without the cutting and indicating mechanism.

Having thus described the invention, what is claimed as new is—

1. A cheese box and cutter comprising a turn-table, a stationary knife, and means for moving the turn-table toward and away from the knife.

2. A cheese box and cutter including a turn-table supported within the box, a stationary knife detachably mounted in the box above the table, and means for moving the table toward and away from the knife.

3. A cheese box and cutter comprising a turn-table, a standard extending downward centrally therefrom and having circular teeth, a toothed segment meshing with said teeth, means for operating said segment to raise and lower the turn-table, and a stationary knife projecting across the table.

4. A cheese box and cutter including a turn-table, a toothed standard extending downward therefrom, a stationary cutter above the table, a hinged lid for the box, a rock-shaft having a crank-arm, a pitman between said arm and lid, a gear-segment on said shaft meshing with the toothed standard, and means for operating said rock-shaft.

In testimony whereof we affix our signatures in presence of two witnesses.

MATTHEW A. BLACK.
FRANK F. SANFORD.

Witnesses:
T. J. TAYLOR,
E. H. DIXON.